United States Patent Office 2,816,112
Patented Dec. 10, 1957

2,816,112

NON-CATALYTIC PREPARATION OF NICOTINIC ACID ESTERS

Roland Kapp, Newark, and Richard Griffith, Shrewsbury, N. J., assignors to Nopco Chemical Company, Harrison, N. J., a corporation of New Jersey No Drawing. Application May 28, 1954, Serial No. 433,267

7 Claims. (Cl. 260—295.5)

This invention relates, in general, to esters of nicotinic acid. More particularly, the invention relates to alkyl esters of nicotinic acid and to the production of these esters.

Alkyl esters of nicotinic acid are of considerable commercial importance and significance. Primarily, their importance resides in the fact that they can be readily converted into nicotinamide, or niacinamide as it is more commonly referred to, the anti-pellegra member of the vitamin B complex. The nicotinic acid esters from which niacinamide has been manufactured heretofore have been produced by a variety of processes. In one of these, the alkyl ester was produced by reacting nicotinyl chloride hydrochloride with a low molecular weight aliphatic alcohol. In another of these processes, the ester was produced by reacting nicotinic acid with a low molecular weight aliphatic alcohol in the presence of an acid esterification catalyst such as sulfuric acid.

In general, the alkyl esters of nicotinic acid produced by either of these methods or the alkyl esters produced by any of the various other methods known in the art are suited for use in the production of niacinamide. However, although quantitatively satisfactory yields of nicotinic acid esters are obtained ultimately thereby, the prior are processes leave much to be desired insofar as their commercial practicality is concerned. In the conventional prior art processes the ester-containing reaction masses produced contain substantial quantities of mineral acid residue. This residue must be substantially removed prior to the conversion of the ester to the amide. Quite obviously, the steps involved in this operation render the production of niacinamide far less economical and far less efficient than it otherwise would be if these steps were not necessary.

It is the object of this invention to provide a highly efficient method for the production of high quality nicotinic acid esters.

It is a more particular object of this invention to provide a method for the production of nicotinic acid esters which are well suited for conversion into high quality niacinamide in excellent yields.

A further object of this invention is to provide an efficient and economical method for producing niacinamide.

Other objects of the invention will be obvious and will, in part, appear hereinafter.

It has been discovered that esters, fully suited for use in the production of niacinamide, are readily prepared without the aid of extraneous catalytic materials by reacting nicotinic acid at elevated temperatures with a water-immiscible, monohydroxy aliphatic alcohol having a boiling point above about 135° C.

In the process of this invention, nicotinic acid is reacted directly with a water-immiscible, monohydroxy aliphatic alcohol having a boiling point above about 135° C. Thus, for example, water-immiscible monohydroxy aliphatic alcohols, such as, 1-pentanol, 1-hexanol, 1-heptanol, 1-octanol, 1-nonanol, 1-dodecanol, 2-octanol, 2-methyl-2-octanol, 3-ethyl-3-octanol, 3,7-dimethyl-1-octanol, 2-ethyl-1-hexanol, 2-methyl-1-hexanol, 5-methyl-1-hexanol, 2-ethyl-1-butanol, etc. can be employed in carrying out this invention. In the preferred embodiment of the invention, nicotinic acid is esterified with a water-immiscible, monohydroxy aliphatic alcohol which has a boiling point within the range of from about 135° C. to about 200° C. The quantity of alcohol used in producing esters which are suitable for subsequent conversion into niocainamide can be varied within rather wide limits. If desired, of course, a stoichiometrically equivalent quantity of acid and alcohol can be used in the production of these esters. However, an excess of alcohol can be and, is preferably employed. In the preferred embodiment of the invention, a ratio of from about 1.5 to about 2.5 equivalent quantities of alcohol or higher for each equivalent quantity of nicotinic acid present is employed.

In producing these esters, the nicotinic acid and the aliphatic alcohol are preferably reacted with each other at the reflux temperature of the mixture. Generally, however, when the aliphatic alcohol reactant to be employed in the esterification of the nicotinic acid has a boiling point above about 200° C., it is preferred to add to the reaction mixture a small amount of an inert solvent having a boiling point between about 135° C. and 200° C., e. g. an aromatic or aliphatic hydrocarbon solvent having a boiling point between about 135° C. and 200° C. The preferred inert solvent is xylene. Sufficient inert solvent is added to give the reaction mixture a reflux temperature of 200° C. or below. Usually from 20% to 25% of inert solvent by volume based on the total volume of the alcohol and the inert solvent is sufficient. The reaction is then carried out at the reflux temperature of the aliphatic alcohol-inert solvent mixture. Neither the sequence in which, nor the temperature at which, the acid reactant and alcohol reactant are charged into the reaction zone is critical to the operability of the invention. Thus, for example, both reactants can be admixed initially in the reaction vessel at room temperature and the mixture subsequently heated to the reaction temperature. However, if desired, the aliphatic alcohol can be charged into the reaction vessel and heated and the nicotinic acid added thereto. After the reactants are admixed, including the inert solvent when it is used, the temperature of the mixture is raised to and maintained at the reflux temperature of the mixture in order to bring about the esterification. The term "inert" as used in referring to the hydrocarbon solvent means that the solvent does not react with either the nicotinic acid or the aliphatic alcohol.

The length of time during which the nicotinic acid and aliphatic alcohol are heated at the reaction temperature to produce the desired ester will vary depending, primarily, upon the temperature at which the reaction is being carried out. The temperature employed in the esterification will depend primarily upon the boiling point of the nicotinic acid-alcohol mixture. In no case, however, will it be necessary to effect the esterification at a temperature above about 200° C. although such higher temperatures can, if desired, be employed. In most instances, nicotinic acid esters fully suited for subsequent conversion to high quality niacinamide can be produced in excellent yields in a reaction time of about twelve hours or less. In many instances, excellent yields of high quality esters can, and will be produced in a reaction time of from about five to seven hours.

The reaction between the carboxyl group of the nicotinic acid molecule and the hydroxyl group of the alcohol molecule and the resultant formation of the nicotinic acid ester and water is a reversible chemical reaction. As such, an equilibrium is created which tends to impede the desired progress of the reaction. In order to counteract this equilibrium and to drive the reaction to substantial completion, the water produced as a by-product of the reaction should be continuously removed from the reaction zone. Failure to remove the water as it forms will result in substantially decreased yields of the nicotinic acid ester. The precise manner in which this water is removed from the reaction mixture does not constitute a part of our invention since the water of esterification can be removed by any method known to and recognized as suitable by those skilled in the art.

Since our process is carried out at the reflux temperature of the reaction mixture, provision must be made to prevent the loss of the volatile alcohol reactant from the reaction mixture. The simplest means for preventing this loss is by providing the reaction vessel with a means for condensing the vapors which are evolved at the high temperatures used, as, for example, by providing the vessel with an air-cooled or water-cooled reflux condenser. However, when a simple condenser apparatus alone is employed, the water vapor which is evolved from the reaction mixture as well as the alcohol vapor will be condensed and returned to the reaction zone. The return of the water to the reaction zone would induce the formation of the reaction-impeding equilibrium referred to heretofore. Therefore, in carrying out this reaction, the apparatus preferably employed provides a means for condensing the evolved alcohol vapors and/or inert solvent vapors and for separating from the alcohol and/or inert solvent the water with which it is admixed in the vapor state. A most convenient means for accomplishing this result when proceeding on a laboratory scale of production is by the use of a Stark-Dean trap or of some analogous device. The manner in which a Stark-Dean trap is employed and the function which it serves is well known to those skilled in the art. The removal and exclusion of the water will prevent the creation of an equilibrium in the system and the reaction will proceed to completion quite readily. When the process is conducted in this manner, a very convenient means is provided for estimating, at any given time, the extent to which the reaction has progressed. This is accomplished merely by observing the quantity of water which is collected in the Stark-Dean trap. Thus, for example, when the quantity of water collected therein aproximately corresponds to the quantity thereof that theoretically will be produced in the reaction, the esterification reaction is, for all practical purposes, substantially complete.

If desired, the resulting ester can be recovered from the esterification reaction mixture in any one of several ways. Thus, for example, when the esterification reaction is complete, the excess alcohol present in the reaction mixture can be removed by distillation and recovered. Thereafter the residue which remains after the removal of the excess alcohol can be distilled to give the desired ester in a relatively pure form. As an alternative method of proceeding, the residue consisting predominantly of the crude ester which remains after the excess alcohol has been removed can be dissolved in a suitable solvent and the solvent solution of ester thus obtained washed with a dilute aqueous solution of alkali. When this procedure is employed, the alkali wash obviates the possibility that any free and unreacted nicotinic acid has become physically entrained in the ester. In general, any inert, water-immiscible organic solvent for the nicotinic acid ester is suitable for use in this step of the process. Particularly suited for use are the liquid aliphatic hydrocarbon solvents such as hexane, heptane, octane, Stoddards solvent, etc. Moreover, the alkali wash solution employed can be a dilute aqueous solution of any soap-forming alkali. Particularly well suited for use is a dilute aqueous solution of sodium carbonate. However, dilute aqueous solutions of other alkalis such as sodium hydroxide, potassium hydroxide, sodium methylate and any of the many soap-forming amines can be employed for this purpose. If desired, any unreacted nicotinic acid in the reaction mixture can be removed therefrom by washing the reaction mixture itself with a dilute aqueous solution of alkali. Since this washing would result in a loss of a part of the excess monohydroxy aliphatic alcohol through entrainment of the alcohol in the aqueous solution of alkali, it is preferred that the washing procedure, if used, be carried out as described above since the alcohols employed in the reaction are much more expensive than the hydrocarbon solvents. When the alkali wash of the solvent solution of the nicotinic acid ester is finished, the solution is allowed to settle into two distinct layers. The layers are then separated, the aqueous alkali solution being discarded. The solvent solution of the desired nicotinic acid ester is thereafter distilled to remove the solvent from the ester. If desired, the ester which remains as residue following the removal of the solvent can itself be distilled. Subsequently the ester can be converted quite readily into niacinamide by any suitable method. If desired the crude ester can be converted directly into niacinamide and any purification required can be carried out on the crude niacinamide.

Our method of preparing nicotinic acid esters is extremely efficient and economical. In the first place, high yields of esters are produced, generally in relatively short periods of time. When produced in accordance with our invention, the esters are entirely free of the extraneous mineral acid residues formed when the prior art processes are employed. These esters can be converted into high yields of exceptionally pure niacinamide without recourse to certain of the solvent extraction steps and distillations resorted to, of necessity, in the prior art. Although in the preferred embodiment of the invention an excess of alcohol is used, the excess unreacted alcohol can readily be recovered and thereafter employed in the manufacture of other batches of nicotinic acid esters.

For a fuller understanding of the nature and objects of this invention, reference should be had to the following examples which are given merely as further illustrations of the invention and are not to be construed in a limiting sense.

*Example I*

In this example, 49.2 grams (0.4 mol) of nicotinic acid (technical grade) and 88.0 grams (1.0 mol) of n-amyl alcohol were refluxed in a flask which was fitted with a Stark-Dean trap having attached thereto a water-cooled reflux condenser. During refluxing, the reaction mixture was continuously stirred. Refluxing was continued for a period of about 65 hours. At the end of this time 7.0 grams of water had been collected in the Stark-Dean trap. Since this quantity of water approximated the amount that would theoretically be produced, the esterification of nicotinic acid and amyl alcohol was considered to be substantially complete. Thereafter, the excess, unreacted n-amyl alcohol was removed from the reaction mixture by vacuum distillation and recovered. The undistilled residue remaining in the flask was subsequently cooled to room temperature and dissolved in hexane. This solution was washed by shaking it with a dilute aqueous solution of sodium carbonate. Thereafter the mixture was permitted to settle into two distinct layers following which the layers were separated from each other. The solvent solution of n-amyl nicotinate was dried and subsequently distilled to remove therefrom the hexane. After distillation, there remained in the flask 81.5 grams of residue consisting essentially of the crude ester, or 105.6% of theory, based upon the weight of nicotinic acid. The weight of the residue in excess of theory was in all probability attributable to the failure to remove completely all of the hexane which had been previously employed. This crude product was thereafter distilled and a yield of 70.8 grams of colorless amyl nicotinate, boiling point of 110° C. to 112° C. at 3 mm., $N_D^{23}=1.4900$ was obtained. This yield was about 91% of theory based upon the weight of nicotinic acid.

Example II 24.6 grams (0.2 mol) of nicotinic acid (technical grade) and 51 grams (0.5 mol) of n-hexyl alcohol were heated at the reflux temperature of the reaction mixture for a period of about nine hours. In this example, the Stark-Dean trap-water-cooled reflux condenser apparatus employed in Example I was again used. While refluxing, the reaction mixture was continuously stirred. At the end of nine hours, 3.60 grams of water were collected in the Stark-Dean trap. Having produced the approximate theoretical quantity of water, the esterification was considered as being substantially complete. Thereafter, the excess hexyl alcohol present in the reaction mixture was removed therefrom by distillation in vacuo. The residue which remained in the flask after distillation was cooled to room temperature and subsequently dissolved in hexane. A dilute aqueous solution of sodium carbonate was added to and mixed with the hexane solution of the crude ester to remove therefrom any unreacted nicotinic acid present. Thereafter, the sodium carbonate solution was separated from the hexane solution. The latter solution was then dried following which the hexane was removed by distillation. By this process, 33.5 grams of crude ester or 81% of theory was obtained. Distillation of this crude product gave 29.0 grams of hexyl nicotinate having a boiling point of 114° to 115° C. at 2 mm., $N_D^{28}=1.4872$. The product was a water-white solution and the yield obtained represented about 70% of theory, based on the weight of nicotinic acid.

Example III

In this example, 24.6 grams (0.2 mol) nicotinic acid technical grade) and 51 grams (0.5 mol) of 2-ethyl butanol were charged into the reaction vessel and heated, with continuous stirring, at the reflux temperature of the mixture. The reaction was carried out in a vessel having attached thereto a Stark-Dean trap and a reflux condenser as previously described. Refluxing was continued for 13 hours, at the end of which time 3.65 grams of water had been collected in the Stark-Dean trap. At this time the reaction was considered as being complete. Thereafter, the excess unreacted 2-ethyl butanol was removed from the reaction mass by vacuum distillation. The quantity of excess alcohol recovered was 26.6 grams, or a recovery of 85% of theory based upon the weight of the excess alcohol used initially. Following this distillation, the residue in the reaction flask was dissolved in hexane. The solution thus obtained was thereafter washed free of all traces of unreacted nicotinic acid by shaking it with an aqueous sodium carbonate solution. Subsequently the aqueous sodium carbonate layer was separated from the hexane layer and discarded. The hexane solution of the crude ester was thereafter distilled to remove the hexane therefrom. The yield of crude ester was 38.7 grams or 93.5% of theory, based upon the weight of the nicotinic acid originally employed. The crude ester was thereafter distilled and 33.7 grams of a colorless 2-ethyl butyl nicotinate having a boiling point of 112° to 113° C. at 2 mm.; $N_D^{24}=1.4900$ was obtained. The yield of refined ester obtained represented about 81.5% of theory based on the weight of the nicotinic acid employed.

Example IV

In this example 24.6 grams (0.2 mol) of nicotinic acid (technical grade) and 61.5 grams (0.5 mol) of capryl alcohol (octanol-2) were charged into the same type of apparatus as used in the previous examples and refluxed for a period of about 13 hours at the reflux temperature of the acid-alcohol mixture. At the end of this period of time, 3.60 ml. of water had been collected in the Stark-Dean trap. The reaction mixture was thereafter distilled to remove the excess unreacted capryl alcohol. The quantity of alcohol recovered by this distillation was 36.1 grams, or 92% of theory based upon the weight of the excess alcohol originally employed. The residue which remained in the flask after distillation was dissolved in hexane. A dilute aqueous solution of sodium carbonate was thereafter added to the hexane solution of the reaction mass and mixed thoroughly therewith. Thereafter, the aqueous sodium carbonate solution was separated from the hexane solution and discarded. The hexane solution was then subjected to distillation in vacuo to separate the hexane from the crude ester which was dissolved therein. The residue remaining after the removal of hexane was crude secondary octyl nicotinate. The yield of this material was 44.2 grams or 94% of theory based upon the original weight of nicotinic acid. This crude ester was thereafter distilled and 37.6 grams of secondary octyl nicotinate having a boiling point of 127° C. at 2 mm.; $N_D^{23}=1.4838$ was obtained. This yield represented about 80% of theory, based on the weight of nicotinic acid originally employed.

Example V

A. In this part of this example 24.6 grams (0.2 mol) of nicotinic acid (U. S. P. grade) and 65.0 grams (0.5 mol) of 2-ethylhexanol were charged into the same type of apparatus as was used in the previous examples and heated with stirring to the reflux temperature of the mixture. Refluxing was continued for about 5 hours until about 3.50 ml. of water had been collected. At the end of this time the reaction mass was distilled to remove therefrom the excess, unreacted 2-ethylhexanol present. Distillation of the mass resulted in the recovery of 36.5 grams of alcohol or 93.5% of theory based upon the weight of the excess alcohol originally employed. The crude ester was immediately thereafter distilled without subjecting the mass to the alkali wash employed in the previous examples. Upon distillation, there was collected 44.3 grams of 2-ethylhexyl nicotinate having a boiling point of 129° C. to 132° C. at 4 mm. This yield was 90.5% of theory based upon the weight of the nicotinic acid originally used. Analysis of this product revealed that it contained about 2.9% of nicotinic acid.

B. In this part of the example, 246 grams (2.0 mols.) of nicotinic acid (technical grade) and 520 grams (4.0 mols.) of 2-ethylhexanol were charged into the same type of apparatus as was used in the previous examples. These materials were heated with stirring at the reflux temperature. After 7 hours of refluxing, 36 ml. of water had been collected in the trap and it was considered that the reaction was substantially complete. Thereafter, the reaction mass was distilled in vacuo to remove therefrom the excess alcohol present. There was collected 256 grams of alcohol distillate, that is 98.5% of theory. The crude ester was then dissolved in hexane and the hexane solution thus produced was washed free of any trace of unreacted nicotinic acid residue by agitating therewith a dilute aqueous solution of sodium carbonate. Subsequently, the aqueous sodium carbonate solution was separated from the hexane solution and discarded. The crude ester was thereafter obtained by removal of the hexane in which it was dissolved by distillation. The yield of crude ester was 455 grams, or 96.8% of theory based upon the weight of the nicotinic acid originally employed. The crude ester was then distilled and 424 grams of refined 2-ethyl hexyl nicotinate having a boiling point of 125° C. at 2 mm.; $N_D^{26}=1.4875$ was obtained. This yield represented 90% of theory based upon the weight of nicotinic acid originally used.

Example VI 188.8 grams (0.8 mol) of 2-ethyl hexyl nicotinate produced as in Example V were dissolved in 500 ml. of dry methanol. The methanol solution was stirred for 24 hours in the presence of ammonia gas under a pressure of 40–42 lbs. per sq. in. at a temperature of 52–55° C. in an autoclave of one gallon capacity. The reaction mixture was then removed from the autoclave and the autoclave washed with 300 ml. of methanol. The methanol used to wash the autoclave was combined with the reaction mixture and the resulting solution distilled at atmospheric pressure to remove the methanol. The white solid slush which was obtained on distillation of the methanol was digested for one hour at reflux temperature with 300 ml. of hexane. This mixture was then cooled at 10° C. and stirred for 2 hours at that temperature and then filtered at that temperature. The residue was washed with hexane and then dried at 80° C. The resulting product was niacinamide having a melting point of 128–31° C. The yield was 86 grams, or 88.5% of theory. The hexane filtrate and washings were combined and distilled to remove the hexane therefrom. The residue which was obtained was vacuum distilled to give 104.9 grams of 2-ethyl hexanol. This was a 100% recovery of the 2-ethyl hexanol formed by conversion of the 2-ethyl hexyl nicotinate into niacinamide.

Having described our invention, what we claim as new and desire to secure by Letters Patent is:

1. A process which comprises esterifying nicotinic acid with a water-immiscible monohydroxy aliphatic alcohol having a boiling point of at least about 135° C. by heating the alcohol with the nicotinic acid at the reflux temperature of the reaction mixture, with the reflux temperature of the reaction mixture being adjusted to a temperature between about 135° C. and 200° C. when the aliphatic alcohol has a boiling point of over 200° C. by adding to the reaction mixture a hydrocarbon solvent selected from the class consisting of aromatic and aliphatic hydrocarbon solvents in an amount sufficient to cause the reaction mixture to reflux at a temperature between about 135° C. and about 200° C., the water formed by the esterification reaction being removed from the reaction mixture as the reaction is carried out, the reaction being carried out without having an esterification catalyst present.

2. The process of claim 1 wherein the alcohol employed is n-amyl alcohol.

3. The process of claim 1 wherein the alcohol employed is n-hexyl alcohol.

4. The process of claim 1 wherein the alcohol employed is 2-ethyl butyl alcohol.

5. The process of claim 1 wherein the alcohol employed is capryl alcohol.

6. The process of claim 1 wherein the alcohol employed is 2-ethyl hexyl alcohol.

7. The process of claim 1 wherein the hydrocarbon solvent is xylene.

References Cited in the file of this patent

UNITED STATES PATENTS 2,758,999 Aries et al. _____ Aug. 14, 1956

FOREIGN PATENTS 724,256 Great Britain _____ Feb. 16, 1955

OTHER REFERENCES

Liston et al.: J. A. C. S., 60: 1264–5 (1938).

Groggins: Unit Processes in Organic Synthesis (1947), McGraw-Hill, New York, pp. 628–629.

Charonnat: Bull. Soc. Shim. France, 1948, 1014–7.